Jan. 6, 1970     N. A. PLATI     3,487,571
VIBRATING DEVICE

Filed Sept. 12, 1966     2 Sheets-Sheet 1

INVENTOR.
NICHOLAS A. PLATI

Jan. 6, 1970    N. A. PLATI    3,487,571
VIBRATING DEVICE
Filed Sept. 12, 1966    2 Sheets-Sheet 2
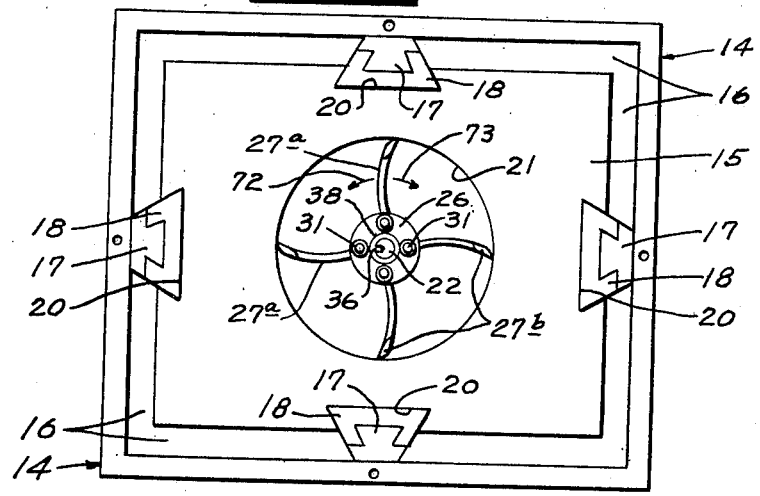
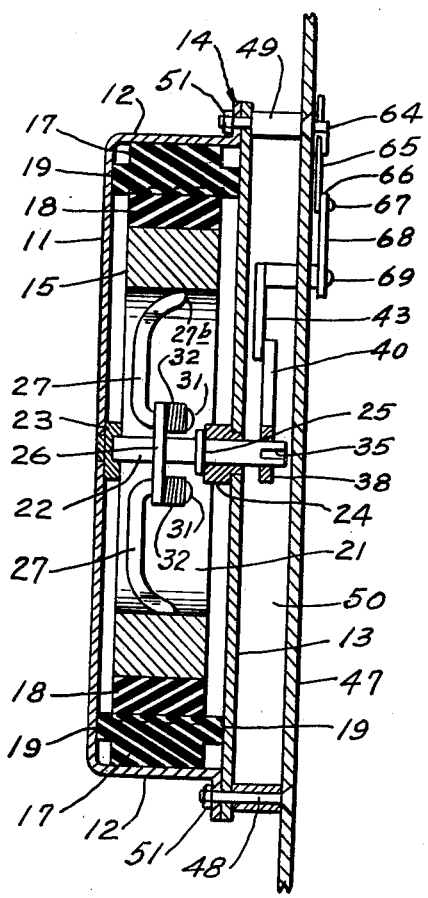
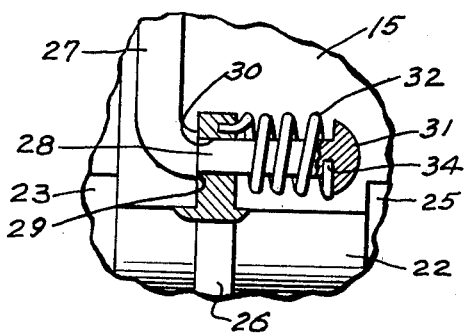
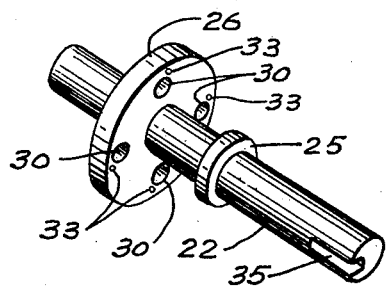
INVENTOR.
NICHOLAS A. PLATI

3,487,571
VIBRATING DEVICE
Nicholas A. Plati, 19 Belmont Terrace,
Yonkers, N.Y. 10703
Filed Sept. 12, 1966, Ser. No. 578,849
Int. Cl. G09f *11/00*
U.S. Cl. 40—106.42     4 Claims

ABSTRACT OF THE DISCLOSURE

A vibrating device for producing energy adapted to be mounted on a vehicle for vibration by the motion of the vehicle. The device includes a mass of material supported on resilient means on a casing, the resilient means being adapted to transmit the vehicle vibrations from the casing to the mass of material. An arbor is movably supported by the casing. Spring means is operatively connected between the mass of material and arbor for transmitting the movement of the mass of material to the arbor.

---

The present invention relates to improvements in a vibrating device and has for an object the provision of a device of this kind which may be installed on trains, trams, buses and the like for advertising purposes.

Another object of the present invention is to provide an improved vibrating device which utilizes the vibration induced by the motor or the motion of the vehicle upon which it is mounted so that it is not necessary to furnish a vibrating means for the device.

A further object of the present invention is to provide an improved structure which is capable of actuating other objects, such as dummies or figures used for advertising purposes.

The present invention aims to provide an improved vibrating device which comprises relatively few parts, is economical to manufacture, can be easily installed and easy to maintain in operating condition.

The present invention also aims to provide an improved device of this character which occupies a relatively small space on the vehicle and presents on attractive appearance.

With the foregoing and other objects in view, the invention will be hereinafter more fully dsecribed and more particularly pointed out in the appended claims.

In the drawings, in which the same parts are denoted by the same reference numerals throughout the several views, FIGURE 1 is a front elevational view of the improved device constructed in accordance with the present invention.

FIGURE 5 is a front elevational view with the cover removed, FIGURE 6 is a sectional view taken on the line 6—6 of FIGURE 1, FIGURE 7 is an enlarged fragmentary view of the spring and arm connection with parts in section, and FIGURE 8 is a perspective view of the arbor.

Figure 1:
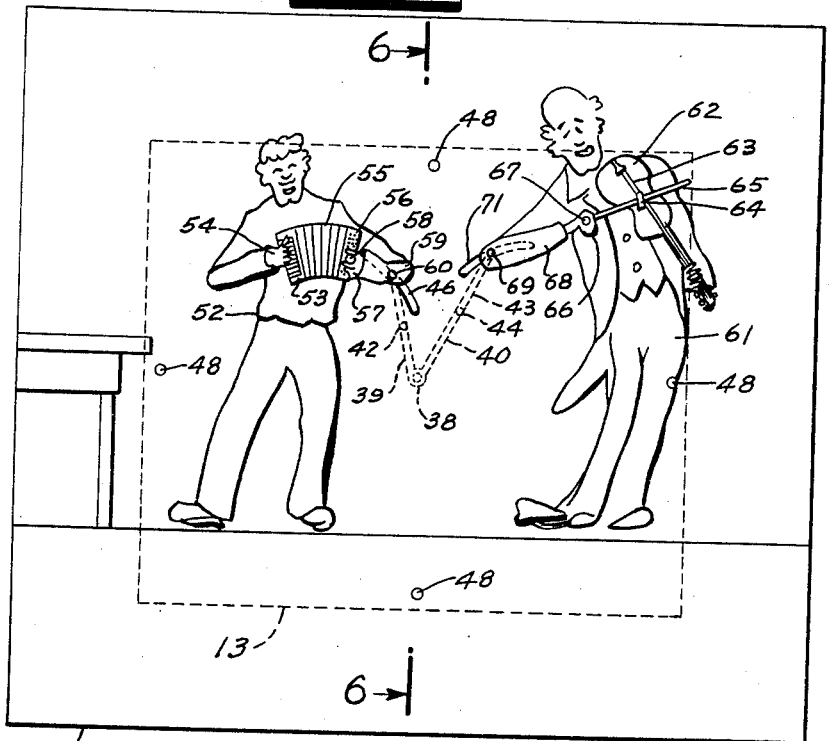
Figure 2:
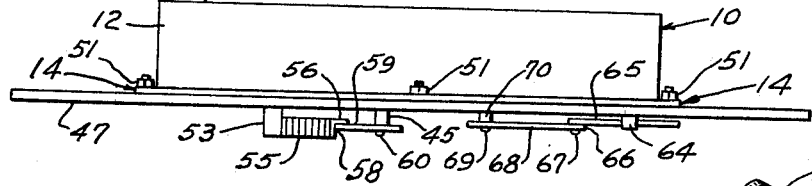
FIGURE 2 is a top plan view of the same.

Referring more particularly to the drawings, 10 generally indicates a casing which may be of any desired material and size and shape but in the drawings is shown to be substantially square. The casing 10 comprises a rear wall 11, four side walls 12 and a cover 13. Each side wall 12 has its peripheral edge portion bent outwardly at substantially right angles to the side wall to form an attaching flange 14.

A frame or mass of material 15 is disposed within the casing 10 and is of substantially the same shape but of less size so that a space 16 is formed between the sides of the frame 15 and the inner faces of the side walls 12 of the casing.

The frame 15 is supported in the casing for vibrating movement with respect thereto by a resilient connection comprising cooperating dovetail or swallow tail members 17 and 18, which in the present instance are shown to be four in number but any desired number and arrangement of resilient connections may be employed. The members 17 may be made of sensitive or elastic rubber or other appropriate material and are secured by any suitable means, such as rubber cement to the inner face of the side walls 12 of the casing 10 substantially intermediate the ends of the walls 12.

The base of each member 17 is of less length than the distance between the rear wall 11 and the cover 13 so that the base of the member does not contact the rear wall and the cover. The free end portion of each member 17 is of sufficient length that its opposite ends engage the inner faces of the rear wall and the cover as indicated at 19.

The members 18 may be made of hard rubber or the like and the base of each is of dovetail shape and is received by a correspondingly shaped socket 20 formed in the edge portion of each side of the frame 15 intermediate the ends thereof. If desired, the bases of the members 18 may be secured to the walls of the sockets 20.

The frame 15 has a substantially circular opening 21 formed in the center thereof through which extends an arbor or shaft 22. The rear end portion of the arbor 22 is supported by a bearing 23 which may be in the form of an alveolus mounted on the inner face of the rear wall 11. The arbor 22 extends forwardly through a bearing 24 which is supported by the cover 13. The arbor is restricted against axial movement rearwardly by the bearing 23 and forwardly by a collar 25 fixed to the arbor and engaging the rear face of the bearing 24.

Figure 3:
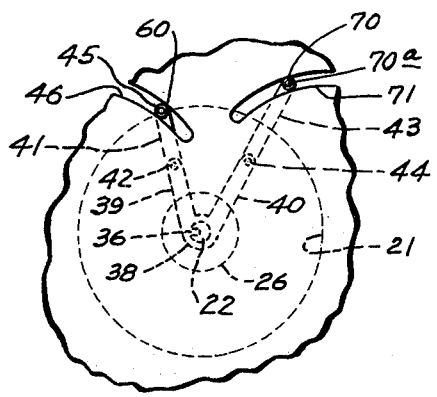
FIGURE 3 is a fragmentary elevational view illustrating linkage in broken lines.
Figure 4:
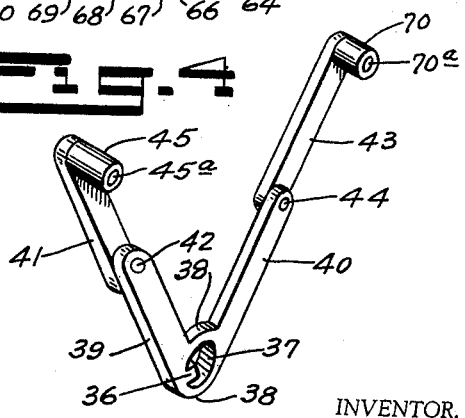
FIGURE 4 is a perspective view of the linkage.

A disk 26 is carried by the arbor 22 for movement therewith. The disk may be formed integral with the arbor or fixed thereto in any suitable manner and is positioned intermediate the ends of the arbor and within the casing. Arms 27 are mounted on the disk 26 and while four such arms are illustrated in the drawings it is to be understood that any desired number could be used. Each arm 27 is substantially L-shaped and its long leg is bowed as indicated at 27a in a clockwise direction looking at FIGURE 3 of the drawings and its outer free end portion is bent forwardly toward the cover 13 as indicated at 27b. The bent portions 27b engage the wall of the opening 21 in the frame 15. The short inner leg has an intermediate portion 28 of reduced diameter which forms a shoulder 29. The reduced portion 28 of each arm 27 is received by one of a plurality of apertures 30 formed in the disk 26 in angular relation to one another and extends therefrom forwardly of the disk. The arms could be mounted with the portions 28 extending rearwardly. The forward free end of each arm is enlarged to form a head 31.

A coil spring 32 encircles the reduced portion 28 of each arm and is confined between the disk 26 and the head 31 so that each arm is permitted to have cushioned rearward movement. The forward movement of each arm is limited by the shoulder 29 engaging the rear face of the disk 26. One end of each spring 32 is received by one of a plurality of sockets 33 which are formed in angular relation to one another and the opposite end of each spring is anchored in a recess 34 formed in the head 31 of each arm.

The arbor 22 extends through a suitable opening in the cover 13 and forwardly of the cover. The forward end portion of the arbor has a keyway 35 formed therein for receiving a key 36 formed on the wall of an opening 37 of a substantially V-shaped lever 38 when the lever is mounted on the arbor. The lever comprises two arms 39 and 40 and a link 41 is pivotally connected at its lower end to the arm 39 adjacent the upper end thereof by a pin 42.

A second link 43 is pivotally connected at its lower end to the arm 40 adjacent the upper end thereof by a pin 44. The upper end portion of the link 41 carries a boss 45 having an internally screw threaded socket 45a. The boss rides in an arcuate slot 46 formed in a plate 47 mounted on the casing 10 by bolts 48. The bolts 48 extend through aligned openings in the plate 47, the cover 13 and the flanges 12 of the casing. Spacing sleeves 49 embrace the bolts 48 and engage the cover 13 and the plate 47 to maintain the plate in forwardly spaced relation to the cover 13 to provide a space 50 therebetween. Nuts 51 are threaded upon the bolts 48.

At 52 is indicated the representation of a person, for example, an accordion player which may be affixed to the outer face of the plate 47 by painting or the like. A keyboard 53 of a simulated accordion may be made of any suitable material and is secured to the outer face of the plate 47 adjacent the right hand 54 of the accordion player to impart the impression that the right hand is holding and operating the keyboard.

The bellows 55 of the accordion may be made of cardboard or the like and is capable of expanding and collapsing movement and has one end secured to the keyboard 53 and its opposite end secured to a strip 56 made of any appropriate material. The left hand 57 of the accordion player is pivotally connected to the strip 56 by a pin 58 or the like and the left arm 59 which may be formed integral with the left hand to form a link is pivotally connected adjacent its free end to the boss 45 by a screw 60 or the like.

At 61 is indicated the representation of a second person, for example, a violin player which may be affixed to the outer free face of the plate 47 as by painting or the like. A representation of a violin is indicated at 62, the strings of which are indicated at 63. The material of the plate 47 may be punched up in line with the length of the strings 63 to form a guide loop or strap 64 for a violin bow 65 which may be made of wood or other suitable material. The bow is pivotally connected adjacent one end to the right hand 66 of the violin player by a pivot pin 67. The right arm 68 of the violin player may be formed integral with the right hand 66 to form therewith a link which is pivotally connected adjacent its free end by a pivot screw 69 to a boss 70 on the link 43. The boss has a screw threaded socket 70a for receiving the screw 69 and rides in an arcuate slot 71.

In the use of the device, the casing 10 will be rigidly fixed to the vehicle, such as a bus, street car or the like in a vertical position so that as soon as the motor of the vehicle is started or the vehicle begins to move the vibration thus set up will be communicated to the casing 10. When the improved device is in the vertical position illustrated in FIGURES 1, 5 and 6 of the drawings, the weight of the frame 15 due to gravity will slightly descend and thus the lower spring arms 27 will be slightly depressed with less pressure on the upper part of the opening of the frame 15. As a result the vibration of the vehicle imparted to the casing 10 will be transmitted through the resilient dovetail connections to the mass 15 causing the mass to move vertically and laterally in both directions. This movement of the mass or frame 15 will be imparted to the spring arms 27 which will cause the arbor 22 through the disk 26 to rotate in a counterclockwise direction as indicated by the arrow 72 shown in FIGURE 5 of the drawings.

The rotation of the arbor 22 will cause the lever 38 to move in a counterclockwise direction and through the links 41 and 43 the left arm 59 of the accordion player will be moved to the left to collapse the bellows 55 of the accordion and the right arm 68 of the violin player will be moved to the left to draw the bow 65 across the strings 63. The loop 64 will support and guide the bow in its movements. The disk 26 rotates with respect to the arms 27 so that the coil springs 32 are wound up and when the tension of the springs exceeds the force of the vibration imparted to the mass 15, the springs 32 will check the rotation of the disk 26 in the counterclockwise direction. The coil springs will then unwind and cause the arbor 22 to rotate in the opposite direction, that is, clockwise as indicated by the arrow 73 illustrated in FIGURE 5 of the drawings. This will cause the left arm of the accordion player and the right arm of the violin player to move to the right to expand the bellows and to move the bow to the right looking at FIGURE 1 of the drawings. When the coil springs 32 have expanded their built-up tension the vibration of the vehicle will cause the device to move again in a counterclockwise direction.

The opposite ends of the springs 32 need not be secured to the disk 26 and the head 31 and in this arrangement the arbor 22 could be continually rotated through 360 degrees. While in the present illustration the musicians are actuated from the arbor 22 through a lever and link arrangement, it is to be understood that wires or the like could be attached directly to the arbor. A small shaft carrying a pulley is fixed to the extended forward end of the arbor 22 and the wires trained over the pulley or the wires could be attached directly to the arbor 22. The vibrating device is adapted to be used for actuating any desired figures or objects and the present illustration of accordion and violin players are merely illustrative of one of the uses to which the invention may be put.

It is obvious that various changes and modifications may be made in the details of construction and design of the above specifically described embodiment of this invention without departing from the spirit thereof, such changes and modifications being restricted only by the scope of the following claims:

What I claim is:

1. An improved vibrating device comprising a casing adapted to be mounted on a vehicle for being vibrated by the motion of said vehicle, a mass of material, resilient means for supporting said mass of material on said casing and for transmitting the vehicle vibration from the casing to the mass of material for vibrating said mass of material, an arbor movably supported by said casing, and means operatively connected to said mass of material and to said arbor for transmitting the movement of said mass of material to said arbor, including a disk mounted on said arbor for rotation therewith, arms having their outer end portions engaging said mass of material and their inner end portions loosely connected to said disk, said disk being capable of rotative movement with respect to the inner end portions of said arms, said spring means constituted by coil springs on said inner end portions of said arms and having their opposite ends anchored to said disk and the inner end portions of the arms, characterized by the fact that representations of figures are supported by said casing, that said representations have movable members, and that operative connections are provided between said arbor and said movable members for imparting movement to said movable members.

2. An improved vibrating device as claimed in claim 1 characterized by the fact that said operative connections comprises a lever keyed to said arbor, a link connected to the lever and to the movable members of one of said representations, a second link connected to said lever and to the movable members of the other of said representations, and guide means for said links.

3. An improved vibrating device as claimed in claim 2 characterized by the fact that one of said representations is in the form of an accordion player, that the movable members of the accordion player comprise an accordion bellows, a hand pivotally connected to said bellows, and an arm joined to said hand and pivotally connected to said first link, that the other of said representations is in the form of a violin player, that the movable members of the violin player comprise a violin bow, a hand pivotally connected to said bow, an arm joined to said hand and pivotally connected to said second link, and that a guide loop is provided for guiding the bow in its movements across the strings of the violin.

4. An improved vibrating device comprising a casing adapted to be mounted on a vehicle for being vibrated by the motion of said vehicle, a mass of material, resilient means for supporting said mass of material on said casing and for transmitting the vehicle vibration from the casing to the mass of material for vibrating said mass of material, an arbor movably supported by said casing, and spring means operatively connected to said mass of material and to said arbor for transmitting the movement of said mass of material to said arbor, the casing having a rear wall, side walls and a cover, a mass of material disposed within said casing in spaced relation thereto and having side walls, resilient dovetail connections between said mass of material and casing, each comprising an element of hard rubber secured to a side wall of said casing and an element of elastic rubber secured to an adjacent side wall of the mass of material, said mass of material having a through opening, said means for transmitting vibrations from said mass of material to said arbor including a collar on said arbor, a bearing on said rear wall for rotatably supporting said arbor and for preventing axial movement of the arbor in one direction, a bearing on said cover for rotatably supporting said arbor and cooperating with said collar to prevent axial movement of the arbor in the opposite direction, spring means positioned within a vehicle in said mass of material and operatively connected to said mass of material and arbor for translating the vibrations of said mass of material and casing into relative movement of said arbor, the forward end portion of said arbor extending through and forwardly of said cover, a plate mounted on said casing in forwardly spaced relation to said cover, and operating means in the space between said cover and plate and connected to said arbor and the movable parts of representations on a vehicle.

References Cited

UNITED STATES PATENTS 2,001,880  5/1935  Lambourne _____ 40—106.43
3,031,034  4/1962  Thomas.

FOREIGN PATENTS 1,180,821  1/1959  France.
510,303  1/1955  Italy.

OTHER REFERENCES

J. P. Den Nartog, Mechanical Vibrations, McGraw-Hill Book Company, New York, 1934, p. 86. TA 355 D4

EUGENE R. CAPOZIO, Primary Examiner

RICHARD CARTER, Assistant Examiner